US010664504B2

(12) United States Patent
Chen et al.

(10) Patent No.: US 10,664,504 B2
(45) Date of Patent: May 26, 2020

(54) INTERACTION METHOD AND APPARATUS BASED ON ARTIFICIAL INTELLIGENCE

(71) Applicant: BEIJING BAIDU NETCOM SCIENCE AND TECHNOLOGY CO., LTD., Beijing (CN)

(72) Inventors: Liwei Chen, Beijing (CN); Xiao Zhou, Beijing (CN); Dianhai Yu, Beijing (CN); Shiqi Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 275 days.

(21) Appl. No.: 15/891,258

(22) Filed: Feb. 7, 2018

(65) Prior Publication Data

US 2018/0336266 A1    Nov. 22, 2018

(30) Foreign Application Priority Data

May 22, 2017   (CN) .......................... 2017 1 0363173

(51) Int. Cl.
*G06F 16/00*     (2019.01)
*G06F 16/332*    (2019.01)
(Continued)

(52) U.S. Cl.
CPC ...... *G06F 16/3325* (2019.01); *G06F 16/3329* (2019.01); *G06F 16/951* (2019.01);
(Continued)

(58) Field of Classification Search
CPC combination set(s) only.
See application file for complete search history.

(56) References Cited

U.S. PATENT DOCUMENTS

| 10,528,667 B2* | 1/2020 | Li ............................ G06N 3/08 |
| 2016/0019290 A1* | 1/2016 | Ratnaparkhi ....... G06F 16/3329 |
| | | 707/743 |

FOREIGN PATENT DOCUMENTS

| CN | 106326984 A | 1/2017 |
| CN | 106547885 A | 3/2017 |

(Continued)

OTHER PUBLICATIONS

Lue Lin, Luis Fernando D'Haro, and Rafael E. Banchs, "A Web-Based Platform for Collection of Human-Chatbot Interactions", ACM , HAI'16, Oct. 4-7, 2016, pp. 363-366. (Year: 2016).*

(Continued)

*Primary Examiner* — Cheryl Lewis
(74) *Attorney, Agent, or Firm* — Marshall, Gerstein & Borun LLP

(57) ABSTRACT

The present disclosure discloses an interaction method and apparatus based on artificial intelligence. A specific embodiment of the method comprises: receiving a current interactive statement entered by a user through a terminal; extracting at least one type of characteristic based on the current interactive statement and a previous interactive statement entered by the user; processing the at least one type of characteristic using a pretrained neural network model to determine whether an intent maintaining relationship exists between the current interactive statement and the previous interactive statement; and if the intent maintaining relationship exists, updating a limitation condition for the previous interactive statement using the current interactive statement, performing information retrieval using the previous interactive statement with the updated limitation condition, and pushing a retrieved retrieval result to the terminal. This embodiment reduces time spent in user entry.

15 Claims, 10 Drawing Sheets

(51) Int. Cl.
  *G06N 3/02*       (2006.01)
  *H04L 12/58*      (2006.01)
  *G06F 16/951*     (2019.01)
  *G06N 5/02*       (2006.01)
  *G06N 3/04*       (2006.01)

(52) U.S. Cl.
  CPC .............. *G06N 3/02* (2013.01); *G06N 5/022* (2013.01); *H04L 51/02* (2013.01); *G06N 3/0445* (2013.01)

(56) References Cited

FOREIGN PATENT DOCUMENTS

| | | |
|---|---|---|
| CN | 106653006 A | 5/2017 |
| EP | 0892356 A2 | 1/1999 |

OTHER PUBLICATIONS

Nil Goksel Canbek and Mehmet Emin Mutlu, "On the Track of Artificial Intelligence: Learning with Intelligent Personal Assistants", International Journal of Human Sciences, pp. 1-10, 2016, www.j-humansciences.com (Year: 2016).*

Craig D. Karl, "AI is Transforming Google Search. The Rest of the Web is Next", WIRED magazine, www.wired.com/2016/02/ai-is-changing-the-technology-behind-google-searches, pp. 1-8, Feb. 4, 2016. (Year: 2016).*

Alex Sciuto, Arnita Saini, Jodi Forlizzi, and Jason I. Hong, "Hey Alexa, What's Up?": Studies of In-Home Conversational Agent Usage, Session 18: Interacting with Conversatioanl Agents, ACM, pp. 857-866, Jun. 9-13, 2018. (Year: 2018).*

\* cited by examiner

INTERACTION METHOD AND APPARATUS BASED ON ARTIFICIAL INTELLIGENCE

CROSS-REFERENCE TO RELATED APPLICATIONS

This application is related to and claims the priority from Chinese Application No. 201710363173.3, filed on May 22, 2017, entitled "Interaction Method and Apparatus based on Artificial Intelligence," the entire disclosure of which is incorporated herein by reference.

TECHNICAL FIELD

The present disclosure relates to the field of computer technologies, specifically to the field of intelligent question-answer technologies, and more specifically, to an interaction method and apparatus based on artificial intelligence.

BACKGROUND

Artificial intelligence, abbreviated as AI in English, is a new technological science for studying and developing theories, methods, techniques, and application systems that simulate, extend, and expand human intelligence. As a branch of computer science, the AI seeks to understand the essence of intelligence and produce a new type of intelligent machine that responds in a similar manner to human intelligence. Study in this field comprises robotics, speech recognition, image recognition, natural language processing, and expert systems, etc.

In the traditional search engine technologies, the general flow is that a user retrieves a query string, and the search engine searches out a document-sorting list with higher correlation based on an inverted index of segmented words, and presents the document sorting list to the user. In recent years, with the development of semantic understanding technologies, the search engine can understand, to a certain extent, the true meaning of the query string expressed by the user, and hereby accurately return results meeting the needs of the user.

However, above existing techniques only allow the user to completely express her own needs in a query round. When the user needs to supplement or modify her own needs based on the result returned by the search engine, the user needs to re-enter the complete query string after modification, and to spend more time in writing the complete query string.

SUMMARY

The present disclosure provides an improved interaction method and apparatus based on artificial intelligence to solve the technical problem mentioned in the foregoing Background section.

In a first aspect, an embodiment of the present disclosure provides an interaction method based on artificial intelligence. The method comprises: receiving a current interactive statement entered by a user through a terminal; extracting at least one type of characteristic based on the current interactive statement and a previous interactive statement entered by the user; processing the at least one type of characteristic using a pretrained neural network model to determine whether an intent maintaining relationship exists between the current interactive statement and the previous interactive statement, the neural network model being configured to characterize whether a corresponding relationship of the intent maintaining relationship exists between a characteristic extracted from the current and previous interactive statements and the current and previous interactive statements; and if the intent maintaining relationship exists, updating a limitation condition for the previous interactive statement using the current interactive statement, performing information retrieval using the previous interactive statement with the updated limitation condition, and pushing a retrieved retrieval result to the terminal.

In some embodiments, the extracting at least one type of characteristic based on the current interactive statement and a previous interactive statement entered by the user comprises at least one of: performing a word segmentation operation on the current interactive statement, and extracting a word obtained by the word segmentation as the characteristic; segmenting at least one independent interactive substatement present in a user search record out of the current interactive statement using a forward maximum matching approach or a backward maximum matching approach, querying from the user search record respectively using each interactive substatement to obtain a webpage title of a search result clicked by the user among search results obtained by searching by the user using the interactive substatement, performing the word segmentation on the webpage title to extract a word obtained by the word segmentation as the characteristic; extracting the characteristic according to whether an intent-related word matching an intent of the previous interactive statement is present in the current interactive statement; and extracting the characteristic out according to whether a statement combination composed of a statement fragment in the current interactive statement and the intent-related word in the previous interactive statement is present in a search statement of the user search record.

In some embodiments, the processing the at least one type of characteristic using a pretrained neural network model to determine whether an intent maintaining relationship exists between the current interactive statement and the previous interactive statement comprises: for each type of characteristic among the at least one type of characteristic, converting each characteristic among the type of characteristic into a corresponding characteristic vector, and performing at least one of summation, convolution and maxpooling on each characteristic vector to generate a first fixed-length vector corresponding to the type of characteristic; connecting the first fixed-length vector corresponding to each type of characteristic to obtain a second fixed-length vector; inputting the second fixed-length vector into a SoftMax classifier; and determining whether the intent maintaining relationship exists between the current interactive statement and the previous interactive statement based on a classification result outputted by the classifier.

In some embodiments, the extracting at least one type of characteristic based on the current interactive statement and the previous interactive statement entered by the user further comprises: extracting a word in the previous interactive statement as the characteristic; and the processing the at least one type of characteristic using a pretrained neural network model to determine whether an intent maintaining relationship exists between the current interactive statement and the previous interactive statement further comprises: mapping the word in the previous interactive statement to a word vector, and converting the mapped word vector into a third fixed-length vector using a recurrent neural networks model; and the inputting the connected second fixed-length vector into a SoftMax classifier comprises: connecting and then inputting the second fixed-length vector and the third fixed-length vector into the SoftMax classifier.

In some embodiments, the method further comprises: determining whether an intent switching relationship exists between the current interactive statement and the previous interactive statement if the intent maintaining relationship does not exist; and selecting the retrieval result corresponding to the previous interactive statement as an object specific to the current interactive statement and operating the object based on the current interactive statement if the intent switching relationship exists.

In some embodiments, the operating the object based on the current interactive statement comprises: when the current interactive statement is a query statement, querying an object property of the object based on the current interactive statement, and pushing the queried object property to the terminal.

In some embodiments, the operating the object based on the current interactive statement comprises: when the current interactive statement is a feedback statement, generating feedback information fed back by the user regarding the object based on the current interactive statement.

In a second aspect, an embodiment of the present disclosure provides an interaction apparatus based on artificial intelligence, which comprises: an extracting unit, configured to extract at least one type of characteristic based on the current interactive statement and a previous interactive statement entered by the user; a processing unit, configured to process the at least one type of characteristic using a pretrained neural network model to determine whether an intent maintaining relationship exists between the current interactive statement and the previous interactive statement, the neural network model being configured to characterize whether a corresponding relationship of the intent maintaining relationship exists between a characteristic extracted from the current and previous interactive statements and the current and previous interactive statements; and a retrieval unit, configured to update, if the intent maintaining relationship exists, a limitation condition for the previous interactive statement using the current interactive statement, perform information retrieval using the previous interactive statement with the updated limitation condition, and push a retrieved retrieval result to the terminal.

In some embodiments, the extracting unit is configured to perform at least one of following operations: performing a word segmentation operation on the current interactive statement, and extracting a word obtained by the word segmentation as the characteristic; segmenting at least one independent interactive substatement present in a user search record out of the current interactive statement using a forward maximum matching approach or a backward maximum matching approach, querying from the user search record respectively using each interactive substatement to obtain a webpage title of a search result clicked by the user among search results obtained by searching by the user using the interactive substatement, performing the word segmentation on the webpage title to extract a word obtained by the word segmentation as the characteristic; extracting the characteristic according to whether an intent-related word matching an intent of the previous interactive statement is present in the current interactive statement; and extracting the characteristic out according to whether a statement combination composed of a statement fragment in the current interactive statement and the intent-related word in the previous interactive statement is present in a search statement of the user search record.

In some embodiments, the processing unit comprises: a first converting subunit, configured to convert, for each type of characteristic among the at least one type of characteristic, each characteristic among the type of characteristic into a corresponding characteristic vector, and perform at least one of summation, convolution and maxpooling on each characteristic vector to generate a first fixed-length vector corresponding to the type of characteristic; a connecting subunit, configured to connect the first fixed-length vector corresponding to each type of characteristic to obtain a second fixed-length vector; an input subunit, configured to input the connected second fixed-length vector into a SoftMax classifier; and a determining subunit, configured to determine whether the intent maintaining relationship exists between the current interactive statement and the previous interactive statement based on a classification result outputted by the classifier.

In some embodiments, the extracting unit is further configured to extract a word in the previous interactive statement as the characteristic; and the processing unit further comprises: a second converting subunit, configured to map the word in the previous interactive statement to a word vector, and convert the mapped word vector into a third fixed-length vector using a recurrent neural networks model; and the input subunit is further configured to connect and then input the second fixed-length vector and the third fixed-length vector into the SoftMax classifier.

In some embodiments, the apparatus further comprises: a determining unit, configured to determine whether an intent switching relationship exists between the current interactive statement and the previous interactive statement if the intent maintaining relationship does not exist; and an operating unit, configured to select the retrieval result corresponding to the previous interactive statement as an object specific to the current interactive statement and operate the object based on the current interactive statement if the intent switching relationship exists.

In some embodiments, the operating unit is further configured to query, when the current interactive statement is a query statement, an object property of the object based on the current interactive statement, and push the queried object property to the terminal.

In some embodiments, the operating unit is further configured to generate, when the current interactive statement is a feedback statement, feedback information fed back by the user regarding the object based on the current interactive statement.

In a third aspect, an embodiment of the present disclosure provides a server, comprising: one or more processors; and a storage apparatus, configured to store one or more programs. When the one or more programs are executed by the one or more processors, the one or more processors are caused to implement any one of the above methods as described in the first aspect.

In a fourth aspect, an embodiment of the present disclosure provides a computer readable storage medium, storing a computer program. When the program is executed by a processor, the processor is caused to implement any one of the above methods as described in the first aspect.

According to the interaction method and apparatus based on artificial intelligence provided by the present disclosure, by analyzing a vector extracted from a previous interactive statement and a next interactive statement, it is analyzed whether the previous interactive statement and the next interactive statement maintain the same intent. When the same intent is maintained, a limitation condition is updated for the previous interactive statement using the current interactive statement, so that information retrieval is performed using the previous interactive statement with the updated limitation condition and a retrieval result is pushed.

In this way, the user may only need to enter herein below an interactive statement as a supplementary condition or change condition to re-query using the supplementary condition or change condition according to the same intent without re-entering the entered portion in the previous interactive statement, thereby reducing time spent in entering by the user, allowing the interaction to better simulate human interaction, and having higher intelligence and interestingness.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
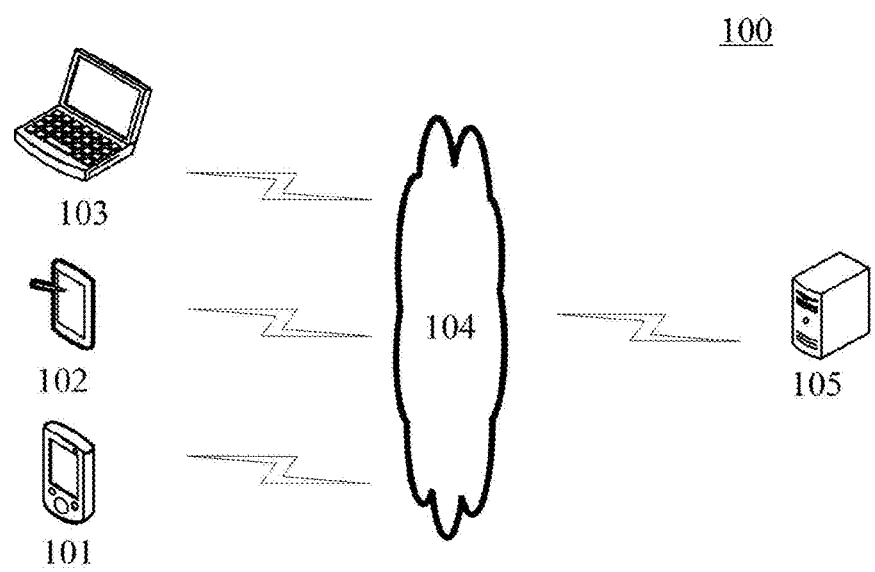
FIG. 1 is an exemplary architecture diagram of a system to which the present disclosure may be applied.

FIG. 1 shows an exemplary architecture of a system 100 to which the interaction method or interaction apparatus based on artificial intelligence according to an embodiment of the present application may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as web browser applications, intelligence robot applications, shopping applications, search applications, instant messaging tools, social platform software, may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server that provides various services, for example, a server in the backend providing support for displaying webpages on the terminal devices 101, 102 or 103. The backend webpage server may perform processing such as analyzing on the received data such as interactive statement, and return a processing result (for example, the searching result) to the terminal devices.

It should be noted that interaction method based on artificial intelligence according to the embodiments of the present application is generally executed by the server 105, and accordingly, an interaction apparatus based on artificial intelligence is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
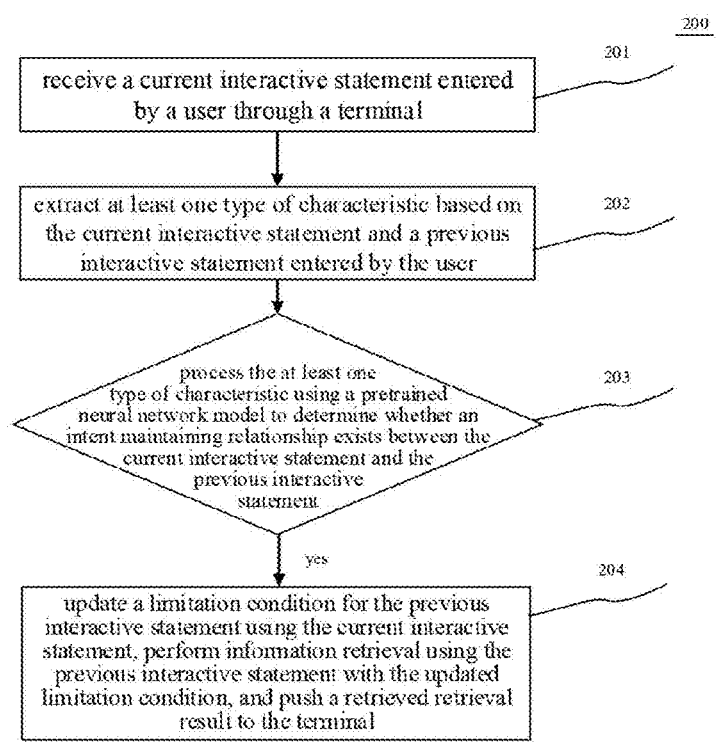
FIG. 2 is a flowchart of an interaction method based on artificial intelligence according to an embodiment of the present disclosure.

Further referring to FIG. 2, a flow 200 of an interaction method based on artificial intelligence according to an embodiment of the present disclosure is illustrated. The interaction method based on artificial intelligence comprises following steps.

In Step 201, a current interactive statement entered by a user through a terminal is received.

In this embodiment, an electronic device (for example, the server as shown in FIG. 1) on which the interaction method based on artificial intelligence runs may receive the current interactive statement entered by the user through the terminal from the terminal used by the user for information interaction by way of wired connection or wireless connection. The above wireless connection manners may comprise but are not limited to 3G/4G connection, WiFi connection, Bluetooth connection, WiMAX connection, Zigbee connection, ultra wideband (UWB) connection and other present known or future developed wireless connection manners. Typically, an interactive statement may be entered when the user uses an application installed on the terminal to retrieve information, and the current interactive statement entered by the user may be transmitted to an electronic device.

In Step 202, at least one type of characteristic is extracted based on the current interactive statement and a previous interactive statement entered by the user.

Figure 3:
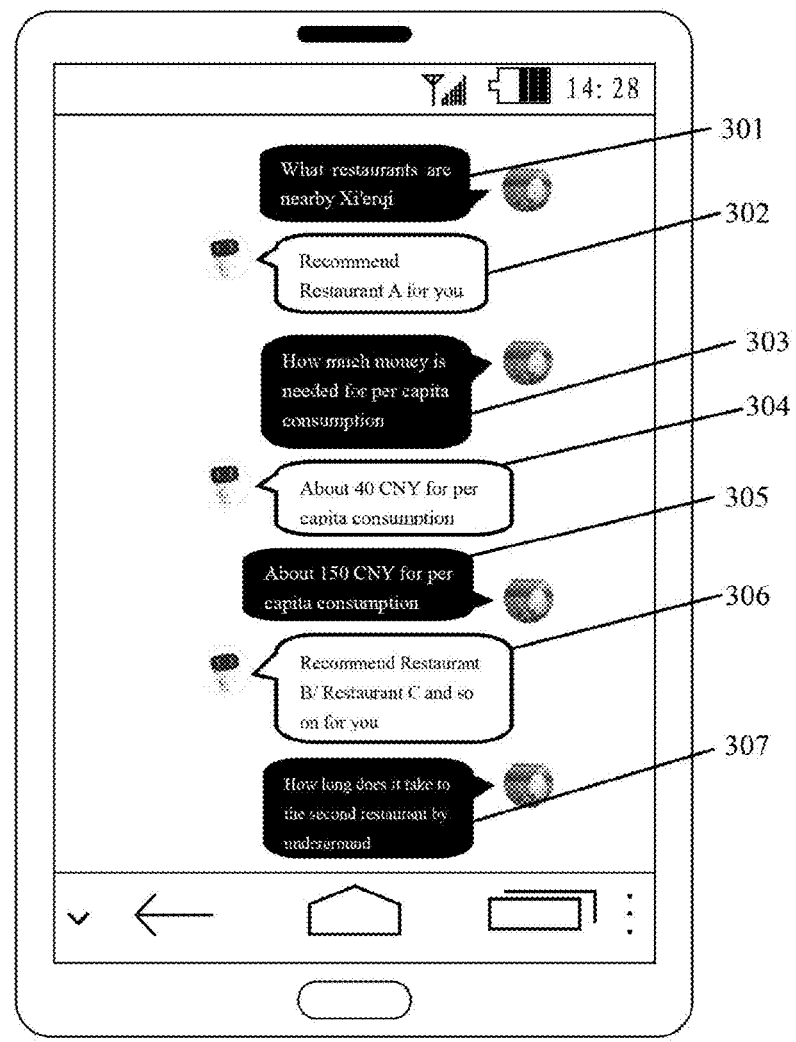
FIG. 3 is an exemplary diagram of a previous interactive statement and a current interactive statement.

In this embodiment, the electronic device also may save the previous interactive statement entered by the user through the terminal device. After receiving the current interactive statement in Step 201, the electronic device may analyze the current interactive statement in combination with the previous interactive statement to extract at least one characteristic according to an analysis result. The previous interactive statement may be a previous interactive statement adjacent to the current interactive statement, or may be separated, by other interactive statements entered by the user, from the current interactive statement. Typically, the previous interactive statement generally is relatively complete, and can indicate a clear intent. An interactive statement entered by the user after the previous interactive statement may be used for making further query or supplementary description of the previous interactive statement. An example of the previous interactive statement and the current interactive statement may be referred to the exemplary diagram as shown in FIG. 3. In FIG. 3, contents displayed in dialog boxes 301, 303, 305 and 307 are interactive statements from the user, and contents displayed in dialog boxes 302, 304 and 306 are answers provided by the system according to the previous interactive statements. These answers are typically retrieval results obtained by retrieving based on the interactive statements. When the user enters the contents in the dialog box 303, 305 or 307, the contents in the dialog box 303, 305 or 307 may serve as the current interactive statements at this moment, the content in the dialog box 301 is a relatively complete query statement, and the content in the dialog box 301 may serve as the previous interactive statement at this moment. Generally, the previous interactive statement "what restaurants are nearby Xi'erqi" may be also referred to as an entry query, and subsequent current interactive statements "how much money is needed for per capita consumption", "about 150 CNY for per capita consumption", "how long does it take to the second restaurant by underground" and so on may be referred to as multiple rounds of queries.

In Step 203, the at least one type of characteristic is processed using a pretrained neural network model to determine whether an intent maintaining relationship exists between the current interactive statement and the previous interactive statement.

In this embodiment, the electronic device may input the extracted at least one characteristic into a neural network model. The neural network model may be pretrained and configured to characterize whether a corresponding relationship of the intent maintaining relationship exists between a characteristic extracted from the current and previous interactive statements and the current and previous interactive statements. In practice, the neural network model may be obtained by training with samples of a large number of current and previous interactive statements, whether these current and previous statements have the intent maintaining relationship being known.

In this way, the electronic device may determine whether the intent maintaining relationship exists between the current interactive statement and the previous interactive statement. The intent is used for indicating specific requirements of the interactive statements, for example, searching for restaurants, searching for movies, inquiring about price, etc.

During the multiple rounds of parsing queries, a single query which is incomplete in meaning needs to be understood by combining the context since other queries may serve as the context. An important factor in the process of understanding is what is the intent of this query in the current context. For a query in multiple rounds of contexts, the intent of the query may be classified into the following two cases. In the first case, the query maintains the intent of the previous round of query and supplements or amends the previous round of query, and thus this case is referred to intent maintenance. In the second case, the intent is changed and queries other relevant information. In the second case, the intent maintaining relationship does not exist.

In Step 204, if the intent maintaining relationship exists, a limitation condition is updated for the previous interactive statement using the current interactive statement, information retrieval is performed using the previous interactive statement with the updated limitation condition, and a retrieved retrieval result is pushed to the terminal.

In this embodiment, when the result determined in Step 203 is that the intent maintaining relationship exists between the current interactive statement and the previous interactive statement, the electronic device may use the current interactive statement to update the limitation condition for the previous interactive statement. Afterwards, the electronic device may use the previous interactive statement with added limitation condition to carry out information retrieval. Finally, the electronic device may push the retrieval result obtained from information retrieval to the terminal so that the terminal display the retrieval result. It is to be noted that when updating a limitation condition, the limitation condition may be newly added into the previous interactive statement, or an existing limitation condition in the previous interactive statement may be modified.

Figure 4:
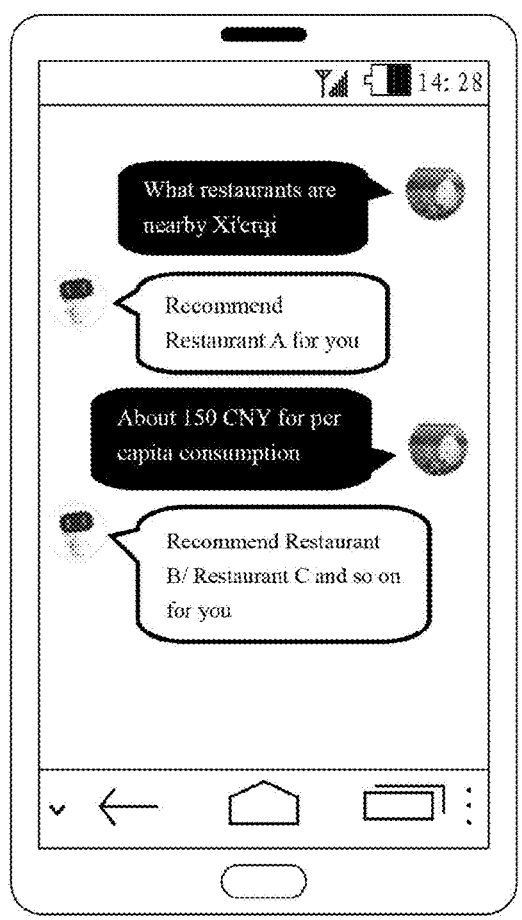
FIG. 4 is a schematic diagram of using the current interactive statement to add a limitation condition for the previous interactive statement when an intent maintaining relationship exists between the current interactive statement and a next interactive statement.

FIG. 4 illustrates a schematic diagram of using the current interactive statement to add a limitation condition for the previous interactive statement when an intent maintaining relationship exists between the current interactive statement and a next interactive statement. In FIG. 4, when "about 150 CNY for per capita consumption" is the current interactive statement, the previous interactive statement is "what restaurants are nearby Xi'erqi". From the above step, it may be determined that the intent maintaining relationship exists between the current interactive statement "about 150 CNY for per capita consumption" and the previous interactive statement "what restaurants are nearby Xi'erqi". In this case, a limitation condition may be added for the previous interactive statement "what restaurants are nearby Xi'erqi" using the current interactive statement "about 150 CNY for per capita consumption". That is, the corresponding interactive statement with the updated limitation condition may be "what restaurants about 150 CNY for per capita consumption are nearby Xi'erqi".

In addition, an existing limitation condition in the previous interactive statement may be modified. For example, when the previous interactive statement is "what restaurants about 150 CNY for per capita consumption are nearby Xi'erqi" and the current interactive statement entered by the user is "what about 100 CNY for per capita consumption", the limitation condition "about 150 CNY" of the previous interactive statement may be modified using "about 100 CNY".

Figure 5:
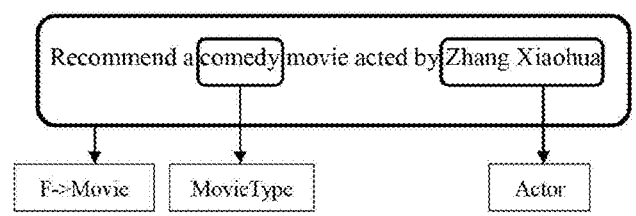
FIG. 5 is a schematic diagram of a parsed result obtained by parsing an interactive statement.

It is also to be noted that in the specific implementation of the updating the limitation condition for the previous interactive statement using the current interactive statement, the previous interactive statement and the current interactive statement may be fused into a single round of new interactive statement for subsequent retrieval. Also this implementation may be achieved by continuously updating the intent obtained by parsing the previous interactive statement using the current interactive statement and a slot position in a slot position combination, and the intent with the slot position updated and the slot position combination are utilized to perform subsequent information retrieval. When using the manner of updating the slot position to process each interactive statement particularly the entry query, the interactive statement may be parsed into the intent and the slot position combination. The slot position is used to denote some constraints or modifications on the intent, for example, requirements for restaurant environments, requirements for types of movies, and so on. FIG. 5 illustrates a parsed result obtained by parsing the interactive statement "recommending a comedy movie acted by Zhangsan". The intent is to search for a movie, and a symbol thereof in the figure is "F->Movie". "Actor=Zhang Xiaohua" and "MovieType=comedy" respectively are the slot positions of the interactive statement, respectively constraining the actor and type of the movie in search. When updating the limitation condition for the previous interactive statement using the current interactive statement, the content of the current interactive statement may be converted into the slot position and inserted into the intent and the slot position combination of the previous interactive statement. In view of a fact that generally multiple rounds of interactive statements serving as the current interactive statement is relatively short, the slot position of the interactive statement may be labeled using a dictionary well mined in advance. For example, when Sichuan cuisine appears, the corresponding slot position may be cate type; when "spicy" appears, the corresponding to slot position is taste; and when "cheap" appears, the corresponding to slot position is price demand.

In addition, words for labeling the slot position in the dictionary may likely be not present in the current statement. In this case, it is impossible to update the limitation condition for the previous interactive statement using the method of updating the slot position. A modified fragment may be extracted from the current interactive statement using a modified fragment mining algorithm, and it is further searched from the retrieval result queried in the previous interactive statement using the modified fragment until a matching result is searched out. For example, for the current interactive statement "a restaurant where a cat is allowed in", the modified fragment "a cat is allowed in" may be mined therefrom, and then an answer may be sought using a traditional inverted index retrieval method. That is, further retrieval is carried out from the restaurant information queried via the previous interactive statement using this modified fragment to obtain a restaurant list having the highest matching degree and push the restaurant list to the user.

In some alternative implementations of this embodiment, Step 203 may be performed in at least one of following manners: performing a word segmentation operation on the current interactive statement, and extracting a word obtained by the word segmentation as the characteristic; segmenting at least one independent interactive substatement present in a user search record out of the current interactive statement using a forward maximum matching approach or a backward maximum matching approach, querying from the user search record respectively using each interactive substatement to obtain a webpage title of a search result clicked by the user among search results obtained by searching by the user using the interactive substatement, performing the word segmentation on the webpage title to extract a word obtained by the word segmentation as the characteristic; extracting the characteristic according to whether an intent-related word matching an intent of the previous interactive statement is present in the current interactive statement; and extracting the characteristic out according to whether a statement combination composed of a statement fragment in the current interactive statement and the intent-related word in the previous interactive statement is present in a search statement of the user search record.

The first manner comprises: performing a word segmentation operation on the current interactive statement, and extracting a word obtained by the word segmentation as the characteristic. In this manner, the word segmentation may be performed on the current interactive statement through a word segmentation operation of fundamental granularity. This characteristic is hereinafter referred to as bags of words. A word obtained through this word segmentation method is shorter, and the advantage of a higher recall rate is provided.

The second manner comprises: segmenting at least one independent interactive substatement present in a user search record out of the current interactive statement using a forward maximum matching approach or a backward maximum matching approach, querying from the user search record respectively using each interactive substatement to obtain a webpage title of a search result clicked by the user among search results obtained by searching by the user using the interactive substatement, and performing the word segmentation on the webpage title to extract a word obtained by the word segmentation as the characteristic. In this implementation, an independent interactive substatement may be segmented out from the current interactive statement according to an interactive statement having been used in the user search record, and a standard thereof may be that the segmented interactive substatement is the same as or similar to the retrieval statement present in the user search record. The user search record may be acquired via a search log of a search engine. When traversing the current interactive statement to search for these interactive substatements, the forward maximum matching approach or the backward maximum matching approach may be adopted to search. After the interactive substatements are segmented out, a webpage title of a search result clicked by the user among search results obtained by searching by the user using these segmented interactive substatement may be acquired according to the user search record. The title of the search result is clicked by the user, this may reflect that the title content can relatively match the actual demand when the user searches using the interactive substatement, and an extension characteristic for extending the current interactive statement may be extracted therefrom. When the word segmentation is performed on the webpage title to extract a word vector, an extracted word is filtered according to indicators such as a TFIDF weight value, and then the filtered word is extracted as the word vector. In this way, a word that can better embody a characteristic of the current interactive statement may be selected through filtration. For example, when the current interactive statement is "is there the movie Inception", the electronic device uses the forward maximum matching approach or backward maximum matching approach to segment out, from the current interactive statement, at least one independent interactive substatement present in the user search record as "Inception". In this case, the electronic device may acquire a search result obtained when the user uses "Inception" as the interactive statement, extract a webpage title of the search result clicked by the user, and perform the word segmentation on the webpage title. For example, words obtained by performing the word segmentation on the webpage title may comprise: complete works, movie, 1080, on-line, Mandarin Chinese, science fiction, film and television, characteristic film, high definition, caption, bilingual, and watch. In this case, these words may be filtered according to indicators such as a TFIDF weight value. For example, words obtained after the filtration may comprise: movie, 1080, on-line, Mandarin Chinese, science fiction, film and television, characteristic film, high definition, caption, bilingual, and so on. A characteristic extracted in this way is hereinafter referred to as a click extension characteristic.

The third manner comprises: extracting the characteristic according to whether an intent-related word matching an intent of the previous interactive statement is present in the current interactive statement. Some related words are present in some intentions. If one interactive statement contain these words, there is larger probability to indicate that the query may likely pertain to this intent, and these words may be referred to as intent-related words. Therefore, in this implementation, whether the current interactive statement comprises an intent-related word matching the intent of the previous interactive statement may be regarded as a characteristic. If the current interactive statement comprises the intent-related word matching the intent of the previous interactive statement, this indicates that the current interactive statement likely maintains the intent of the previous round of interactive statement. Otherwise, it is less likely to maintain the intent. The intent-related words may be captured manually or automatically collected using a computer. For example, for the intent of watching a movie "F->Movie", relatively common intent-related words comprise "movie", "film", "blockbuster", and so on. When the current interactive statement comprises the intent-related words such as "movie", "film", and "blockbuster", it is more likely that the current interactive statement maintains the intent of the previous interactive statement. A characteristic extracted in this implementation is hereinafter referred to as an intent-related word characteristic.

The fourth manner comprises: extracting the characteristic out according to whether a statement combination composed of a statement fragment in the current interactive statement and the intent-related word in the previous interactive statement is present in a search statement of the user search record. In this implementation, an intent-related word in the previous interactive statement and a statement fragment in the current interactive statement may constitute a statement combination, and then it is detected whether the statement fragment is present in the user search record to extract a characteristic vector as the circumstances may require. For example, when the previous interactive statement is "I want to watch a movie" and the current interactive statement is "a horror movie", the intent-related word of the previous interactive statement is movie, and the statement fragment "horror" of the current interactive statement and the intent-related word "movie" may constitute the statement combination "a horror movie". When "a horror movie" is present in the user search record, the characteristic may be regarded as positive to extract the characteristic vector. In theory, when the statement fragment of the current interactive statement and the intent-related word of the previous interactive statement may constitute an available statement in the user search record, this indicates that the statement fragment may modify the intent-related word in a real natural language. In this case, it is more likely to maintain the same intent between the current interactive statement and the previous interactive statement. The characteristic extracted in this implementation is hereinafter referred to as a current and previous collocation characteristic.

In some alternative implementations of this embodiment, Step 203 may specifically comprise following steps: for each type of characteristic among the at least one type of characteristic, converting each characteristic among the type of characteristic into a corresponding characteristic vector, and performing at least one of summation, convolution and maxpooling on each characteristic vector to generate a first fixed-length vector corresponding to the type of characteristic; connecting the first fixed-length vector corresponding to each type of characteristic to obtain a second fixed-length vector; inputting the second fixed-length vector into a Soft-Max classifier; and determining whether the intent maintaining relationship exists between the current interactive statement and the previous interactive statement based on a classification result outputted by the classifier.

In this implementation, for each type of characteristic vector extracted in Step 202, the electronic device may perform, in the neural network model, one or more calculating operations of summation, convolution and maxpooling on each vector to convert the vector corresponding to each type of characteristic into the first fixed-length vector having a fixed length. Alternatively, the operations of convolution and/or maxpooling may be performed for the bags of words. Alternatively, the operation of summation may be performed for a click extension characteristic, an intent-related word characteristic and a current and previous collocation characteristic. Next, the first fixed-length vector corresponding to each type of characteristic may be connected in the neural network model to obtain a second fixed-length vector, and the second fixed-length vector may be inputted into the SoftMax classifier. Finally, the SoftMax classifier may output a classification result according to the inputted second fixed-length vector, and the electronic device may determine whether the intent maintaining relationship exists between the current interactive statement and the previous interactive statement according to the classification result.

In some alternative implementations of this embodiment, Step 202 may further comprise: extracting a word in the previous interactive statement as the characteristic. In addition, Step 203 may further comprise: mapping the word in the previous interactive statement to a word vector, and converting the mapped word vector into a third fixed-length vector using a recurrent neural networks model. Meanwhile, the inputting the connected second fixed-length vector into a SoftMax classifier may comprise: connecting and then inputting the second fixed-length vector and the third fixed-length vector into the SoftMax classifier. In this implementation, the word vector extracted from the previous interactive statement may be converted into a third fixed-length vector having a fixed length using a recurrent neural networks model (RNN), and the third fixed-length vector and the second fixed-length vector are connected and then inputted into the SoftMax classifier for analysis, so that in this implementation, the word characteristic of the previous interactive statement is synthetically considered. In this way, accuracy of recognizing the intent maintaining relationship may be enhanced finally.

Figure 6:
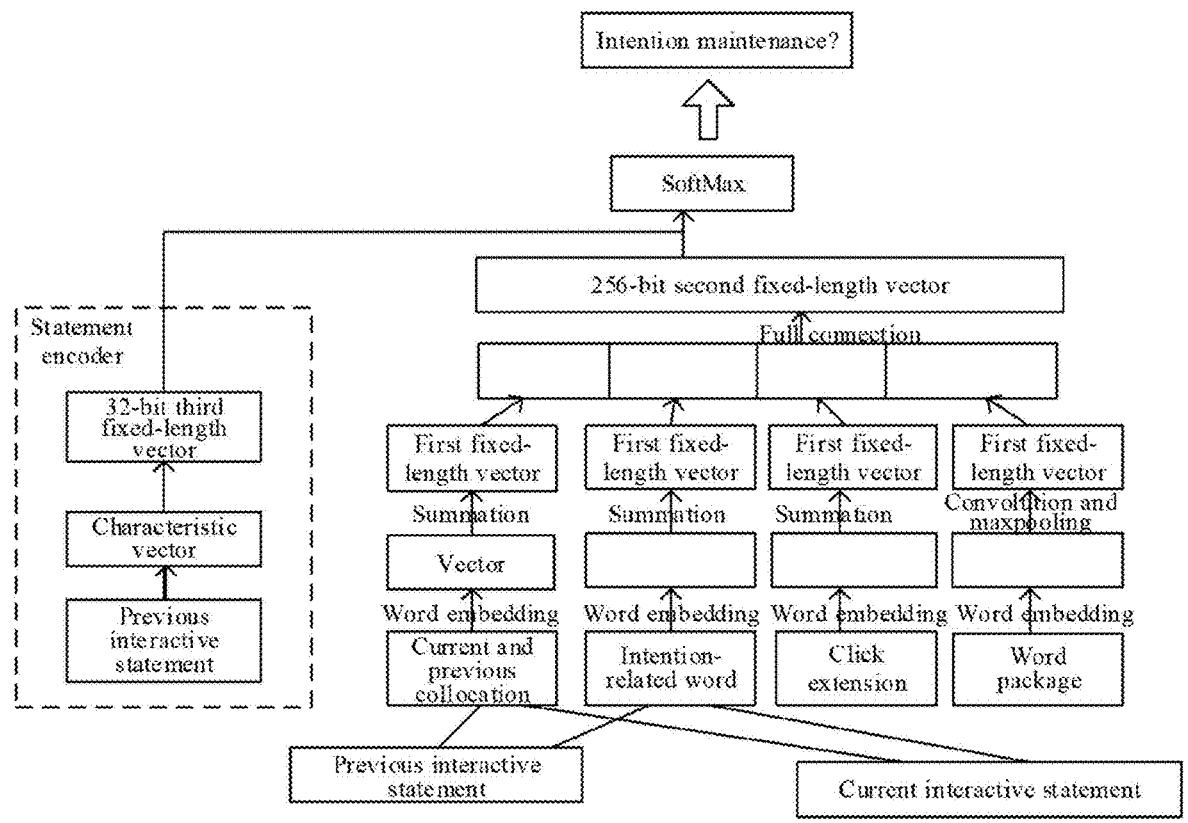
FIG. 6 is a schematic diagram of procedures of processing via a neural network model.

In practice, procedures of processing via the neural network model may refer to the schematic diagram corresponding to FIG. 6. In FIG. 6, the previous interactive statement, the current and previous collocation characteristic, the intent-related word characteristic, the click extension characteristic and bags of words may be processed as characteristics. Specifically, the previous interactive statement, the current and previous collocation characteristic, the intent-related word characteristic, the click extension characteristic and bags of words are first extracted as characteristic vectors. After a plurality of characteristic vectors are extracted, summation may be performed on the current and previous collocation characteristic, the intent-related word characteristic, the click extension characteristic and so on to respectively obtain a corresponding first fixed-length vector. The bags of words may be converted into the corresponding first fixed-length vector via the convolutional neural network (CNN) and/or maxpooling. Next, the first fixed-length vectors respectively corresponding to the current and previous collocation characteristic, the intent-related word characteristic, the click extension characteristic and the bags of words are connected and converted into 256-bit second fixed-length vectors having a fixed length. The previous interactive statement may be converted into a 32-bit third fixed-length vector by a statement encoder. Specifically, a word in the previous interactive statement may be first mapped into a word vector, and then the original word vector is converted into the 32-bit third fixed-length vector by the RNN. The second fixed-length vector and the third fixed-length vector may be connected and then inputted into the SoftMax classifier for processing, and finally a result whether to be intent maintenance is obtained.

According to the method provided by the above embodiment of the present disclosure, by analyzing a vector extracted from a previous interactive statement and a next interactive statement, it is analyzed whether the previous interactive statement and the next interactive statement maintain the same intent. When the same intent is maintained, a limitation condition is updated for the previous interactive statement using the current interactive statement, so that information retrieval is performed using the previous interactive statement with the updated limitation condition and a retrieval result is pushed. In this way, the user may only need to enter herein below an interactive statement as a supplementary condition or change condition to re-query using the supplementary condition or change condition according to the same intent without re-entering the entered portion in the previous interactive statement, thereby reducing time spent in entering by the user, allowing the interaction to better simulate human interaction, and having higher intelligence and interestingness.

Figure 7:
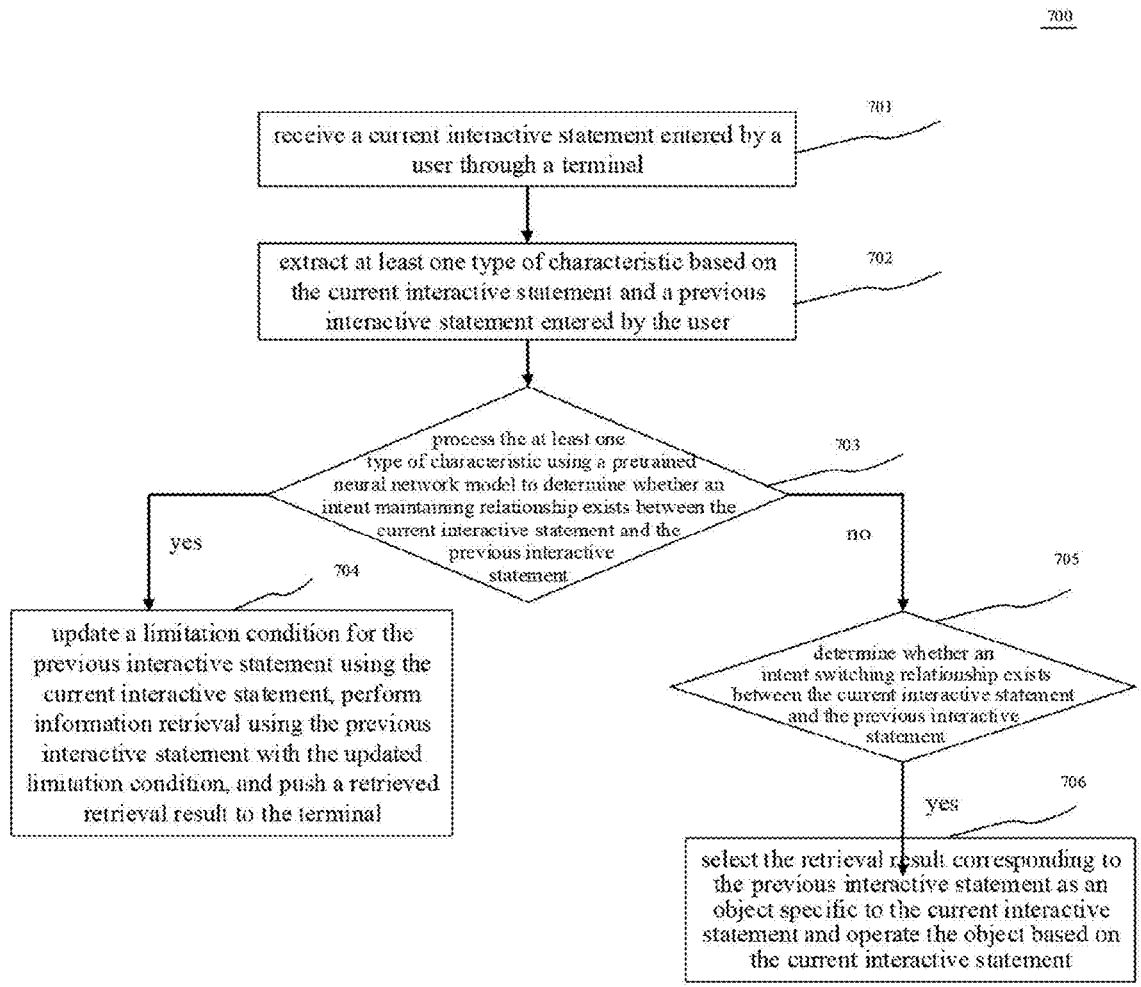
FIG. 7 is a flowchart of an interaction method based on artificial intelligence according to another embodiment of the present disclosure.

Further referring to FIG. 7, a flow 700 of the interaction method based on artificial intelligence according to still another embodiment is illustrated. The flow 700 of the interaction method based on artificial intelligence comprises following steps.

In Step 701, a current interactive statement entered by a user through a terminal is received.

In this embodiment, specific processes in Step 701 may refer to Step 201 in the embodiment corresponding to FIG. 2, and thus their detailed descriptions are omitted herein.

Step 702: at least one type of characteristic is extracted based on the current interactive statement and a previous interactive statement entered by the user.

In this embodiment, specific processes in Step 702 may refer to Step 202 in the embodiment corresponding to FIG. 2, and thus their detailed descriptions are omitted herein.

In Step 703, the at least one type of characteristic is processed using a pretrained neural network model to determine whether an intent maintaining relationship exists between the current interactive statement and the previous interactive statement.

In this embodiment, specific processes in Step 703 may refer to Step 203 in the embodiment corresponding to FIG. 2, and thus their detailed descriptions are omitted herein.

In Step 704, if the intent maintaining relationship exists, a limitation condition is updated for the previous interactive statement using the current interactive statement, information retrieval is performed using the previous interactive statement with the updated limitation condition, and a retrieved retrieval result is pushed to the terminal.

In this embodiment, specific processes in Step 704 may refer to Step 204 in the embodiment corresponding to FIG. 2, and thus their detailed descriptions are omitted herein.

In Step 705, whether an intent switching relationship exists between the current interactive statement and the previous interactive statement is determined if the intent maintaining relationship does not exist.

In this embodiment, if the result determined in Step 703 is that the intent maintaining relationship does not exist, the electronic device may further determine whether the intent switching relationship exists between the current interactive statement and the previous interactive statement. According to a manner of determination, corresponding characteristic vectors may be extracted from the current interactive statement and the previous interactive statement and inputted into a trained machine learning model. In this way, a recognition is made according to the machine learning model. The machine learning model may be trained using the previous interactive statement of a known present intent switching relationship and/or a known absent intent switching relationship and a next interactive statement as training data.

In Step 706, the retrieval result corresponding to the previous interactive statement is selected as an object specific to the current interactive statement and the object is operated based on the current interactive statement if the intent switching relationship exists.

In this embodiment, if the determination result in Step 705 is that the intent switching relationship exists between the current interactive statement and the previous interactive statement, the electronic device may select the retrieval result corresponding to the previous interactive statement as an object and operate the object based on the current interactive statement. That is, if the intent switching relationship exists between the current interactive statement and the previous interactive statement, the current interactive statement may absorb a previous round of intent return value as a parameter, thereby finishing further processes. The operation on the object comprises but is not limited to query, feedback, and so on.

Figure 8:
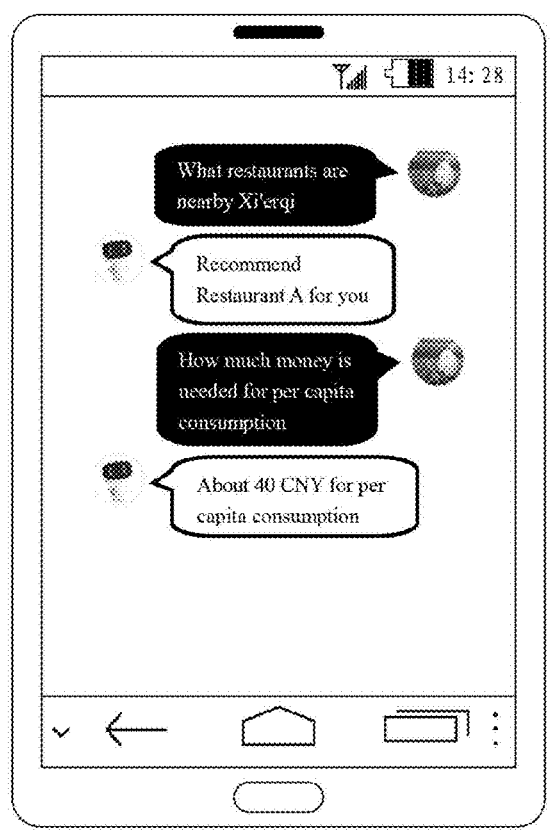
FIG. 8 is a schematic diagram of an interaction scenario according to an implementation corresponding to the embodiment in FIG. 7.

In some alternative implementations of this embodiment, operating the object based on the current interactive statement may comprise: when the current interactive statement is a query statement, querying an object property of the object based on the current interactive statement, and pushing the queried object property to the terminal. In implementation, when the current interactive statement is the query statement, the object property may be queried for the previous retrieval result. This implementation may allow the user to make a detailed inquiry of the object property of the retrieval result corresponding to the previous interactive statement, so that the user may learn about more specific information on the retrieval result. Specific processes of this implementation may refer to FIG. 8. In FIG. 8, the current interactive statement entered by the user is "how much money is needed for per capita consumption in this restaurant" and the previous interactive statement is "what restaurants are nearby Xi'erqi". In this case, it may be determined, from Step 701-Step 703, that no intent maintaining relationship exists between the current interactive statement "how much money is needed for per capita consumption in this restaurant" and the previous interactive statement "how much money is needed for per capita consumption in this restaurant". However, from Step 705, it may be determined that the intent switching relationship exists between the current interactive statement and the previous interactive statement. In this case, the retrieval result of the previous interactive statement may be regarded as an object of query cost attribute, and then cost attribute information "about 40 CNY for per capita consumption" is queried out and pushed to the terminal.

It is to be noted that this step may be repetitively performed to implement iterative inquiry of the previous retrieval result.

In some alternative implementations of this embodiment, operating the object based on the current interactive statement may comprise: when the current interactive statement is a feedback statement, generating feedback information fed back by the user regarding the object based on the current interactive statement. In this implementation, when the current interactive statement entered by the user is the feedback statement, the retrieval result of the previous interactive statement may be regarded as an feedback object of the feedback statement to generate the corresponding feedback information. That is, the user may feedback the preceding retrieval result by entering a feedback statement, and the electronic device may save the generated feedback result. In practice, the feedback result may be used for subsequent big data analysis, comprising but not limited to customer consumption tendency analysis or commercial entity popularity degree analysis. It is to be noted that the feedback statement may be positive feedback such as "it is relatively convenient to come here" or may be negative feedback such as "it is too expensive".

Figure 9:
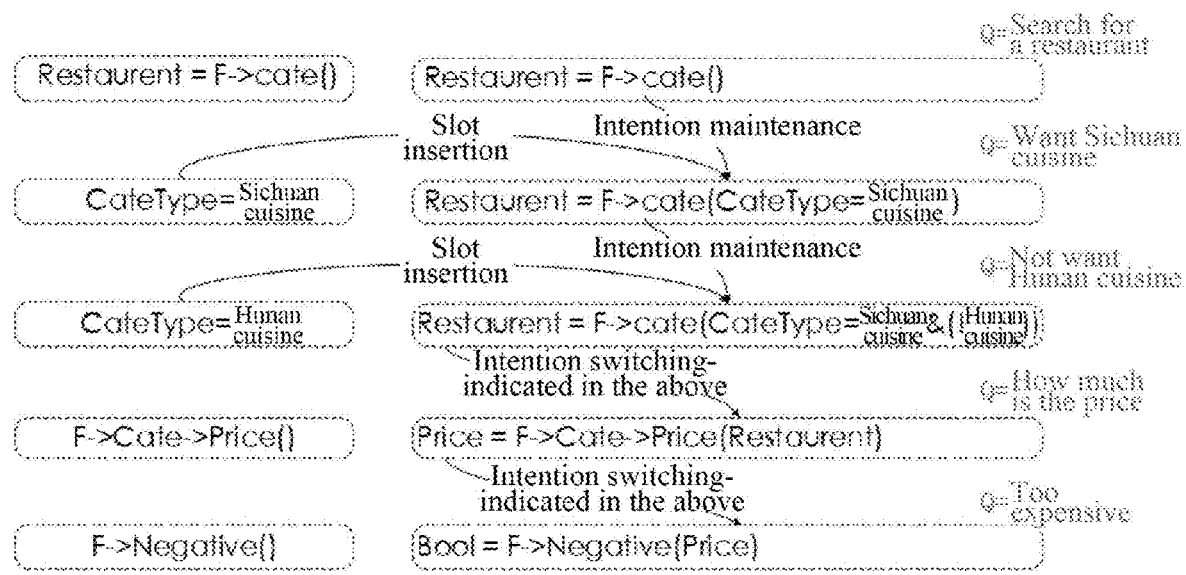
FIG. 9 is a schematic diagram of an intent relationship among different interactive statements according to the embodiment in FIG. 7.

Further referring to FIG. 9, FIG. 9 illustrates a schematic diagram of an intent relationship among different interactive statements in the interaction method based on artificial intelligence according to this embodiment. In FIG. 9, the user first enters a first interactive statement (i.e., entry query), and a parsed result thereof is Restaurant=F->cate( ), namely the intent is to search for cate. Afterwards, the user enters a second interactive statement (i.e., the first multiple rounds of queries). At this moment, an intent maintaining relationship between the current interactive statement and the previous interactive statement is parsed. That is, the intent of the current interactive statement is Restaurant=F->cate( ), and the parsed result thereof is CateType=Sichuan cuisine (the cate type is Sichuan cuisine). In this case, a slot position may be added into the parsed result Restaurant=F->cate( ) using CateType=Sichuan cuisine, and the newly-formed parsed result may be Restaurant=F->cate(CateType=Sichuan cuisine). Afterwards, the user again enters a third interactive statement, and a parsed result obtained by parsing the third interactive statement is CateType=! Hunan cuisine (the cate type is not Hunan cuisine), and the third interactive statement is the same as the two preceding interactive statements in intent, namely Restaurant=F->cate( ). In this case, Cate-Type=! Hunan cuisine may be added into the parsed result corresponding to the second interactive statement, and the processed parsed result is Restaurant=F->cate (CateType=Sichuan cuisine&(!Hunan cuisine)). Next, the user enters a fourth interactive statement, and a parsed result obtained by parsing the fourth interactive statement is F->cate( )->Price( ), namely, inquiring about cate price. Compared with the intent of the preceding interactive statement, the intent of the fourth interactive statement has been changed, the intent maintaining relationship does not exist between the fourth interactive statement and the preceding interactive statement, and it is discovered that an intent switching relationship exists between the fourth interactive statement and the preceding interactive statement through further analysis. In this case, the above corresponding retrieval result may be selected as an object, and the object is queried using the current interactive statement. That is, the above retrieval result Restaurant is determined as the query object of F->cate( )->Price( ). In this case, after the fourth interactive statement is entered, the corresponding parsed result may be expressed as F->cate( )->Price(Restaurant). Finally, the user enters a fifth interactive statement, and the intent parsed from this interactive statement is F->Negative( ). That is, a negative feedback is performed. After it is parsed that no intent maintaining relationship exists between the fifth interactive statement and the fourth interactive statement, it is discovered that an intent switching relationship exists between the fifth interactive statement and the fourth interactive statement through further analysis. In this case, the preceding query structure may be recorded as the object of negative feedback.

As can be seen from FIG. 7, compared with the embodiment corresponding to FIG. 2, the flow 700 of the interaction method based on artificial intelligence in this embodiment adds a step of using the result of the previous interactive statement as the object of this query or feedback if the intent switching relationship exists between the current interactive statement and the previous interactive statement, which is advantageous to feeding back attributes or assessments of the above query result to the user without entering a specific object. In this way, time required for entering the query result is reduced for the user, and the interaction can be allowed to get closer to a dialogue between natural persons, thereby enhancing an emulation degree.

Figure 10:
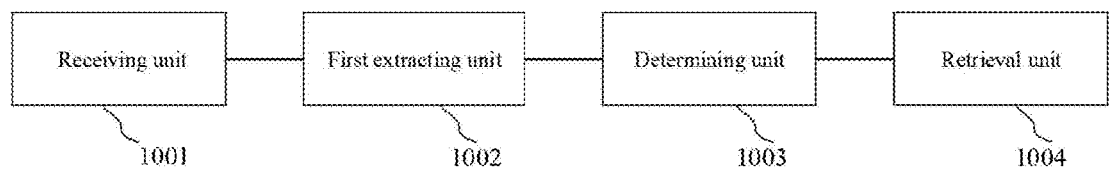
FIG. 10 is a schematic structural diagram of an interaction apparatus based on artificial intelligence according to an embodiment of the present disclosure.

Further referring to FIG. 10, as an implementation of the method as shown in the foregoing figures, the present disclosure provides an embodiment of an interaction apparatus based on artificial intelligence. The apparatus embodiment corresponds to the method embodiment as shown in FIG. 2, and the apparatus specifically may be used in various electronic devices.

As shown in FIG. 10, the interaction apparatus 1000 based on artificial intelligence in this embodiment comprises: a receiving unit 1001, an extracting unit 1002, a processing unit 1003, and a retrieval unit 1004. The receiving unit 1001 is configured to receive a current interactive statement entered by a user through a terminal. The extracting unit 1002 is configured to extract at least one type of characteristic based on the current interactive statement and a previous interactive statement entered by the user. The processing unit 1003 is configured to process the at least one type of characteristic using a pretrained neural network model to determine whether an intent maintaining relationship exists between the current interactive statement and the previous interactive statement, where the neural network model is configured to characterize whether a corresponding relationship of the intent maintaining relationship exists between a characteristic extracted from the current and previous interactive statements and the current and previous interactive statements. The retrieval unit 1004 is configured to update, if the intent maintaining relationship exists, a limitation condition for the previous interactive statement using the current interactive statement, perform information retrieval using the previous interactive statement with the updated limitation condition, and push a retrieved retrieval result to the terminal.

In this embodiment, specific processes of the receiving unit 1001, the extracting unit 1002, the processing unit 1003 and the retrieval unit 1004 may refer to Step 201, Step 202, Step 203 and Step 204 in the embodiment corresponding to FIG. 2, and thus their detailed descriptions are omitted herein.

In some alternative implementations of this embodiment, the extracting unit 1002 is configured to perform at least one of following operations: performing a word segmentation operation on the current interactive statement, and extracting a word obtained by the word segmentation as the characteristic; segmenting at least one independent interactive substatement present in a user search record out of the current interactive statement using a forward maximum matching approach or a backward maximum matching approach, querying from the user search record respectively using each interactive substatement to obtain a webpage title of a search result clicked by the user among search results obtained by searching by the user using the interactive substatement, performing the word segmentation on the webpage title to extract a word obtained by the word segmentation as the characteristic; extracting the characteristic according to whether an intent-related word matching an intent of the previous interactive statement is present in the current interactive statement; and extracting the characteristic out according to whether a statement combination composed of a statement fragment in the current interactive statement and the intent-related word in the previous interactive statement is present in a search statement of the user search record. Specific processes of this implementation may refer to corresponding implementation in the embodiment corresponding to FIG. 2, and thus their detailed descriptions are omitted herein.

In some alternative implementations of this embodiment, the processing unit 1003 may comprise: a first converting subunit (not shown), configured to convert, for each type of characteristic among the at least one type of characteristic, each characteristic among the type of characteristic into a corresponding characteristic vector, and perform at least one of summation, convolution and maxpooling on each characteristic vector to generate a first fixed-length vector corresponding to the type of characteristic; a connecting subunit (not shown), configured to connect the first fixed-length vector corresponding to each type of characteristic to obtain a second fixed-length vector; an input subunit (not shown), configured to input the connected second fixed-length vector into a SoftMax classifier; and a determining subunit (not shown), configured to determine whether the intent maintaining relationship exists between the current interactive statement and the previous interactive statement based on a classification result outputted by the classifier. Specific processes of this implementation may refer to corresponding implementation in the embodiment corresponding to FIG. 2, and thus their detailed descriptions are omitted herein.

In this embodiment, the extracting unit 1002 is further configured to extract a word in the previous interactive statement as the characteristic. The processing unit 1003 may further comprise: a second converting subunit (not shown), configured to map the word in the previous interactive statement to a word vector, and convert the mapped word vector into a third fixed-length vector using a recurrent neural networks model. The input subunit is further configured to connect and then input the second fixed-length vector and the third fixed-length vector into the SoftMax classifier. Specific processes of this implementation may refer to corresponding implementation in the embodiment corresponding to FIG. 2, and thus their detailed descriptions are omitted herein.

In some alternative implementations of this embodiment, the apparatus 1000 may comprise: a determining unit, configured to determine whether an intent switching relationship exists between the current interactive statement and the previous interactive statement if the intent maintaining relationship does not exist; and an operating unit, configured to select the retrieval result corresponding to the previous interactive statement as an object specific to the current interactive statement and operate the object based on the current interactive statement if the intent switching relationship exists. Specific processes of this implementation may refer to corresponding steps in the embodiment corresponding to FIG. 2, and thus their detailed descriptions are omitted herein.

In some alternative implementations of this embodiment, the operating unit is further configured to query, when the current interactive statement is a query statement, an object property of the object based on the current interactive statement, and push the queried object property to the terminal. Specific processes of this implementation may refer to corresponding implementation in the embodiment corresponding to FIG. 7, and thus their detailed descriptions are omitted herein.

In some alternative implementations of this embodiment, the operating unit is further configured to generate, when the current interactive statement is a feedback statement, feedback information fed back by the user regarding the object based on the current interactive statement. Specific processes of this implementation may refer to corresponding implementation in the embodiment corresponding to FIG. 7, and thus their detailed descriptions are omitted herein.

Figure 11:
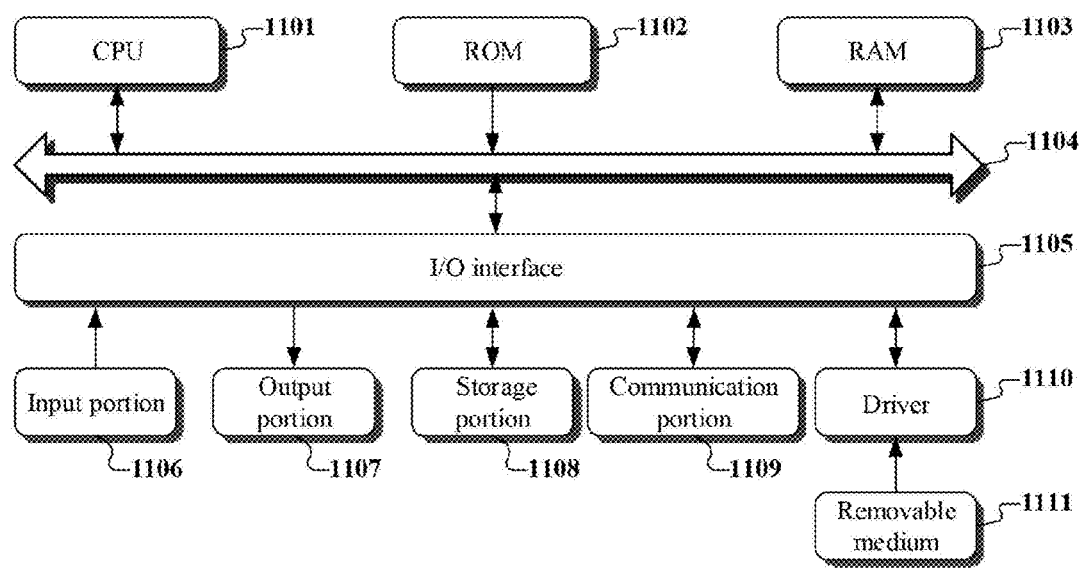
FIG. 11 illustrates a structural schematic diagram of a computer system adapted to implement a server of the embodiments of the present disclosure.

Furthermore, the present disclosure also provides a server, comprising: one or more processors; and a storage apparatus, configured to store one or more programs. When the one or more programs are executed by the one or more processors, the one or more processors are caused to implement the method as recited in the embodiment corresponding to FIG. 2 or the embodiment corresponding to FIG. 7 or any implementation thereof. FIG. 11 illustrates a schematic structural diagram of a computer system 1100 adapted to implement a server of the embodiments of the present disclosure. The server as shown in FIG. 11 is merely an example, and no limitation should be imposed on functions or scope of use of the embodiment of the present disclosure.

As shown in FIG. 11, the computer system. 1100 includes a central processing unit (CPU) 1101, which may execute various appropriate actions and processes in accordance with a program stored in a read-only memory (ROM) 1102 or a program loaded into a random access memory (RAM) 1103 from a storage portion 1108. The RAM 1103 also stores various programs and data required by operations of the system 1100. The CPU 1101, the ROM 1102 and the RAM 1103 are connected to each other through a bus 1104. An input/output (I/O) interface 1105 is also connected to the bus 1104.

The following components are connected to the I/O interface 1105: an input portion 1106; an output portion 1107; a storage portion 1108 including a hard disk and the like; and a communication portion 1109 comprising a network interface card, such as a LAN card and a modem. The communication portion 1109 performs communication processes via a network, such as the Internet. A driver 1110 is also connected to the I/O interface 1105 as required. A removable medium 1111 may be installed on the driver 1110, to facilitate the retrieval of a computer program from the removable medium 1111, and the installation thereof on the storage portion 1108 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 1109, and/or may be installed from the removable media 1111. The computer program, when executed by the central processing unit (CPU) 1101, implements the above mentioned functionalities as defined by the methods of the present application.

It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electromagnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In the present disclosure, the computer readable storage medium may be any physical medium containing or storing programs which can be used by a command execution system, apparatus or element or the incorporation thereof. In the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but is not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a receiving unit, a receiving unit, a receiving unit, and a retrieval unit, where the names of these units or modules are not considered as a limitation to the units or modules. For example, the receiving unit may also be described as "a unit for receiving a current interactive statement entered by a user through a terminal."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: receive a current interactive statement entered by a user through a terminal; extract at least one type of characteristic based on the current interactive statement and a previous interactive statement entered by the user; process the at least one type of characteristic using a pretrained neural network model to determine whether an intent maintaining relationship exists between the current interactive statement and the previous interactive statement, the neural network model being configured to characterize whether a corresponding relationship of the intent maintaining relationship exists between a characteristic extracted from the current and previous interactive statements, and the current and previous interactive statements; and if the intent maintaining relationship exists, update a limitation condition for the previous interactive statement using the current interactive statement, perform information retrieval using the previous interactive statement with the updated limitation condition, and push a retrieved retrieval result to the terminal.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions.

What is claimed is:

1. An interaction method based on artificial intelligence, the method comprising:
receiving a current interactive statement entered by a user through a terminal;
extracting at least one type of characteristic based on the current interactive statement and a previous interactive statement entered by the user;
processing the at least one type of characteristic using a pretrained neural network model to determine whether an intent maintaining relationship exists between the current interactive statement and the previous interactive statement, the neural network model being configured to characterize whether a corresponding relationship of the intent maintaining relationship exists between a characteristic extracted from the current and previous interactive statements, and the current and previous interactive statements; and if the intent maintaining relationship exists, updating a limitation condition for the previous interactive statement using the current interactive statement, performing information retrieval using the previous interactive statement with the updated limitation condition, and pushing a retrieved retrieval result to the terminal.

2. The method according to claim 1, wherein the extracting at least one type of characteristic based on the current interactive statement and a previous interactive statement entered by the user comprises at least one of:

performing a word segmentation operation on the current interactive statement, and extracting a word obtained by the word segmentation as the characteristic;

segmenting at least one independent interactive substatement present in a user search record out of the current interactive statement using a forward maximum matching approach or a backward maximum matching approach, querying from the user search record respectively using each interactive substatement to obtain a webpage title of a search result clicked by the user among search results obtained by searching by the user using the interactive substatement, performing a word segmentation on the webpage title and extracting a word obtained by the word segmentation as the characteristic;

extracting the characteristic according to whether an intent-related word matching an intent of the previous interactive statement is present in the current interactive statement; and extracting the characteristic according to whether a statement combination composed of a statement fragment in the current interactive statement and the intent-related word in the previous interactive statement is present in a search statement of the user search record.

3. The method according to claim 1, wherein the processing the at least one type of characteristic using a pretrained neural network model to determine whether an intent maintaining relationship exists between the current interactive statement and the previous interactive statement comprises:

for each type of characteristic among the at least one type of characteristic, converting each characteristic among the type of characteristic into a corresponding characteristic vector, and performing at least one of summation, convolution and maxpooling on each characteristic vector to generate a first fixed-length vector corresponding to the type of characteristic;

connecting the first fixed-length vector corresponding to each type of characteristic to obtain a second fixed-length vector;

inputting the second fixed-length vector into a SoftMax classifier; and determining whether the intent maintaining relationship exists between the current interactive statement and the previous interactive statement based on a classification result outputted by the classifier.

4. The method according to claim 3, wherein the extracting at least one type of characteristic based on the current interactive statement and the previous interactive statement entered by the user further comprises:

extracting a word in the previous interactive statement as the characteristic; and the processing the at least one type of characteristic using a pretrained neural network model to determine whether an intent maintaining relationship exists between the current interactive statement and the previous interactive statement further comprises:

mapping the word in the previous interactive statement to a word vector, and converting the mapped word vector into a third fixed-length vector using a recurrent neural networks model; and the inputting the connected second fixed-length vector into a SoftMax classifier comprises:

connecting and then inputting the second fixed-length vector and the third fixed-length vector into the SoftMax classifier.

5. The method according to claim 1, further comprising:

determining whether an intent switching relationship exists between the current interactive statement and the previous interactive statement if the intent maintaining relationship does not exist; and selecting the retrieval result corresponding to the previous interactive statement as an object specific to the current interactive statement and operating the object based on the current interactive statement if the intent switching relationship exists.

6. The method according to claim 5, wherein the operating the object based on the current interactive statement comprises:

when the current interactive statement is a query statement, querying an object property of the object based on the current interactive statement, and pushing the queried object property to the terminal.

7. The method according to claim 5, wherein the operating the object based on the current interactive statement comprises:

when the current interactive statement is a feedback statement, generating feedback information fed back by the user regarding the object based on the current interactive statement.

8. An interaction apparatus based on artificial intelligence, the apparatus comprising:

at least one processor; and a memory storing instructions, which when executed by the at least one processor, cause the at least one processor to perform operations, the operations comprising:

receiving a current interactive statement entered by a user through a terminal;

extracting at least one type of characteristic based on the current interactive statement and a previous interactive statement entered by the user;

processing the at least one type of characteristic using a pretrained neural network model to determine whether an intent maintaining relationship exists between the current interactive statement and the previous interactive statement, the neural network model being configured to characterize whether a corresponding relationship of the intent maintaining relationship exists between a characteristic extracted from the current and previous interactive statements and the current and previous interactive statements; and updating, if the intent maintaining relationship exists, a limitation condition for the previous interactive statement using the current interactive statement, performing information retrieval using the previous interactive statement with the updated limitation condition, and pushing a retrieved retrieval result to the terminal.

9. The apparatus according to claim 8, wherein the extracting at least one type of characteristic based on the current interactive statement and a previous interactive statement entered by the user comprises at least one of:

performing a word segmentation operation on the current interactive statement, and extracting a word obtained by the word segmentation as the characteristic;

segmenting at least one independent interactive substatement present in a user search record out of the current interactive statement using a forward maximum matching approach or a backward maximum matching approach, querying from the user search record respectively using each interactive substatement to obtain a webpage title of a search result clicked by the user among search results obtained by searching by the user using the interactive substatement, performing the word segmentation on the webpage title and extracting a word obtained by the word segmentation as the characteristic;

extracting the characteristic according to whether an intent-related word matching an intent of the previous interactive statement is present in the current interactive statement; and extracting the characteristic out according to whether a statement combination composed of a statement fragment in the current interactive statement and the intent-related word in the previous interactive statement is present in a search statement of the user search record.

10. The apparatus according to claim 8, wherein the processing the at least one type of characteristic using a pretrained neural network model to determine whether an intent maintaining relationship exists between the current interactive statement and the previous interactive statement comprises:

for each type of characteristic among the at least one type of characteristic, converting each characteristic among the type of characteristic into a corresponding characteristic vector, and perform at least one of summation, convolution and maxpooling on each characteristic vector to generate a first fixed-length vector corresponding to the type of characteristic;

connecting the first fixed-length vector corresponding to each type of characteristic to obtain a second fixed-length vector;

inputting the connected second fixed-length vector into a SoftMax classifier; and determining whether the intent maintaining relationship exists between the current interactive statement and the previous interactive statement based on a classification result outputted by the classifier.

11. The apparatus according to claim 10, wherein extracting at least one type of characteristic based on the current interactive statement and the previous interactive statement entered by the user further comprises:

extracting a word in the previous interactive statement as the characteristic; and the processing the at least one type of characteristic using a pretrained neural network model to determine whether an intent maintaining relationship exists between the current interactive statement and the previous interactive statement further comprises:

mapping the word in the previous interactive statement to a word vector, and converting the mapped word vector into a third fixed-length vector using a recurrent neural networks model; and the inputting the connected second fixed-length vector into a SoftMax classifier comprises:

connecting and then inputting the second fixed-length vector and the third fixed-length vector into the SoftMax classifier.

12. The apparatus according to claim 8, the operations further comprising:

determining whether an intent switching relationship exists between the current interactive statement and the previous interactive statement when the intent maintaining relationship does not exist; and selecting the retrieval result corresponding to the previous interactive statement as an object specific to the current interactive statement and operating the object based on the current interactive statement if the intent switching relationship exists.

13. The apparatus according to claim 12, wherein the operating the object based on the current interactive statement comprises:

when the current interactive statement is a query statement, querying an object property of the object based on the current interactive statement, and pushing the queried object property to the terminal.

14. The apparatus according to claim 12, wherein the operating the object based on the current interactive statement comprises:

when the current interactive statement is a feedback statement, generating feedback information fed back by the user regarding the object based on the current interactive statement.

15. A non-transitory computer storage medium storing a computer program, which when executed by a processor, causes the processor to perform operations, the operations comprising:

receiving a current interactive statement entered by a user through a terminal;

extracting at least one type of characteristic based on the current interactive statement and a previous interactive statement entered by the user;

processing the at least one type of characteristic using a pretrained neural network model to determine whether an intent maintaining relationship exists between the current interactive statement and the previous interactive statement, the neural network model being configured to characterize whether a corresponding relationship of the intent maintaining relationship exists between a characteristic extracted from the current and previous interactive statements, and the current and previous interactive statements; and if the intent maintaining relationship exists, updating a limitation condition for the previous interactive statement using the current interactive statement, performing information retrieval using the previous interactive statement with the updated limitation condition, and pushing a retrieved retrieval result to the terminal.

* * * * *